(12) United States Patent
Mitchell et al.

(10) Patent No.: US 8,331,926 B2
(45) Date of Patent: Dec. 11, 2012

(54) METHODS AND SYSTEMS FOR VEHICLE COMMUNICATIONS WITH GROUND SYSTEMS

(75) Inventors: Timothy M. Mitchell, Seattle, WA (US); Wilma Shaw, Seattle, WA (US); Patrick M. Harper, Renton, WA (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 11/554,068

(22) Filed: Oct. 30, 2006

(65) Prior Publication Data

US 2007/0139169 A1 Jun. 21, 2007

Related U.S. Application Data

(60) Provisional application No. 60/741,702, filed on Dec. 2, 2005.

(51) Int. Cl.
*H04W 4/00* (2009.01)
(52) U.S. Cl. .......................... 455/431; 370/328
(58) Field of Classification Search ............ 455/431, 455/430, 463, 411, 422.1, 445, 453; 370/252, 370/411, 328, 329, 331
See application file for complete search history.

(56) References Cited

U.S. PATENT DOCUMENTS

| | | | |
|---|---|---|---|
| 6,148,179 A | 11/2000 | Wright et al. | |
| 6,160,998 A * | 12/2000 | Wright et al. | 455/66.1 |
| 6,246,320 B1 | 6/2001 | Monroe | |
| 6,757,712 B1 * | 6/2004 | Bastian et al. | 709/206 |
| 6,760,778 B1 | 7/2004 | Nelson et al. | |
| 6,937,164 B2 | 8/2005 | Thomson et al. | |
| 6,990,319 B2 | 1/2006 | Wright et al. | |
| 7,116,221 B2 | 10/2006 | Addy | |
| 7,123,927 B2 | 10/2006 | Narazaki et al. | |
| 7,177,939 B2 * | 2/2007 | Nelson et al. | 709/230 |
| 2002/0032006 A1 * | 3/2002 | Nair et al. | 455/66 |
| 2002/0138625 A1 * | 9/2002 | Bruner et al. | 709/227 |
| 2002/0160773 A1 | 10/2002 | Gresham et al. | |
| 2003/0055975 A1 * | 3/2003 | Nelson et al. | 709/227 |
| 2003/0208764 A1 * | 11/2003 | Galipeau et al. | 725/76 |
| 2004/0003133 A1 * | 1/2004 | Pradhan et al. | 709/318 |
| 2004/0132495 A1 * | 7/2004 | Horton et al. | 455/562.1 |
| 2004/0260777 A1 * | 12/2004 | Kolb et al. | 709/206 |
| 2005/0053026 A1 | 3/2005 | Mullan et al. | |

(Continued)

FOREIGN PATENT DOCUMENTS

EP 1426870 A2 6/2004

OTHER PUBLICATIONS

Extended European Search Report dated Mar. 26, 2012 for EP 06024929.9, 6 pages.

*Primary Examiner* — Michael Faragalla
(74) *Attorney, Agent, or Firm* — Armstrong Teasdale LLP

(57) ABSTRACT

A method of communicating data between a vehicle and a ground system is described. The method includes initiating a connection between a plurality of clients on a vehicle and a ground system, and communicating, in parallel, data between the plurality of clients and the ground system.

19 Claims, 3 Drawing Sheets

U.S. PATENT DOCUMENTS

| | | |
|---|---|---|
| 2005/0149238 A1* | 7/2005 | Stefani et al. ............... 701/33 |
| 2006/0176881 A1* | 8/2006 | Ma et al. .................... 370/392 |
| 2006/0217851 A1 | 9/2006 | McGuffin et al. |
| 2006/0252422 A1* | 11/2006 | Kauffman et al. .......... 455/431 |
| 2006/0276127 A1* | 12/2006 | Cruz et al. ................. 455/12.1 |
| 2007/0021117 A1* | 1/2007 | McKenna et al. ........... 455/431 |
| 2007/0115938 A1* | 5/2007 | Conzachi et al. ........... 370/352 |
| 2007/0194951 A1* | 8/2007 | Thomson et al. ........... 340/945 |
| 2007/0220109 A1* | 9/2007 | Nelson et al. ............... 709/218 |
| 2008/0305762 A1* | 12/2008 | Malosh ...................... 455/404.1 |

* cited by examiner

METHODS AND SYSTEMS FOR VEHICLE COMMUNICATIONS WITH GROUND SYSTEMS

CROSS REFERENCE TO RELATED APPLICATIONS

This application claims the priority of U.S. Provisional Patent Application Ser. No. 60/741,702 filed Dec. 2, 2005, which is hereby incorporated by referenced in its entirety.

BACKGROUND OF THE INVENTION

This invention relates generally to communications between a vehicle and ground systems and, more particularly, relates to distributed data download processing.

Systems operating onboard a vehicle may generate significant amounts of data. For example, in the case of an aircraft, Advanced Avionics, In-flight Entertainment systems, and certain digital systems generate significant amounts of data. In a particular example, engines are monitored at every stage of operation, which results in generation of significant amounts of data. Such monitoring data includes, for example, compression ratios, rotations per minute, temperature, and vibration data. A separate electronic digital controller monitor (EDCM) typically monitors each engine. In addition, fuel related data, data related to maintenance and Airplane Health Monitoring, operational information, In-flight Entertainment equipment updates, catering data, and passenger data such as duty free shopping are routinely generated onboard the aircraft.

Currently, when aircraft land, paper copies containing collected data are carried off of the aircraft and delivered to the back office or forwarded to another office to be logged. Alternatively, data is downloaded manually from the aircraft by physically coupling a wire leading from the ground system to an interface on the aircraft, and collecting the data from the various data generators.

Wireless communication systems between an aircraft and ground systems are also known. With at least some of such systems, when an aircraft arrives on the ground (sometimes referred to as weight on wheels, WOW), data is downloaded from a central server that resides on the aircraft to a ground system. Data may also be uploaded to such central server as well. Such communications occur, for example, using a low speed VHF based network or a wireless local area network.

Demand for additional communication channels and data transfer needs is driving rapid change in connection with such communications. Such increased demand is due, for example, to increasing reliance by ground systems upon data from the aircraft, as well as increased communication needs of the flight crew, cabin crew, and passengers. In addition, data diversity along with an increasing number of applications producing and consuming data in support of a wide range of business processes puts additional demand on communications.

BRIEF DESCRIPTION OF THE INVENTION

In one aspect, a method of communicating data between a vehicle and a ground system is provided. The method includes initiating a connection between a plurality of clients on a vehicle and a ground system. The method further includes communicating, in parallel, data between the plurality of clients and the ground system.

In another aspect, a system for communicating data from a vehicle to a ground system is provided. The system includes a plurality of clients onboard the vehicle. Each client is configured to communicate, in parallel with the other clients, with the ground system.

DETAILED DESCRIPTION OF THE INVENTION

The systems and methods described herein are sometimes described in the context of an airplane. Such systems and methods, however, are not limited to practice in connection with just airplanes and can be used in connection with any aircraft or vehicle. As used herein, the term aircraft refers to airplanes, helicopters, missiles, and any object capable of flight. Furthermore, the term vehicle refers to any object capable of mobility, including automobiles, ships, tanks, trucks, and locomotives. In addition, the terms "data", "message", and "file" are sometimes used herein interchangeably, and each of those terms broadly refer to information in any format.

Also, communication between an aircraft and ground system sometimes is referred to herein as Aircraft/Ground Systems Communication (AGSC). AGSC generally is full duplex (i.e., bidirectional) between the aircraft and ground. Generally, and in one aspect, the systems and methods described herein facilitate transferring data from an aircraft to ground system upon arrival of the aircraft on the ground. Such communication, however, is not limited to communication when the aircraft is on the ground, and also includes communication when the aircraft is in the air.

Figure 1:
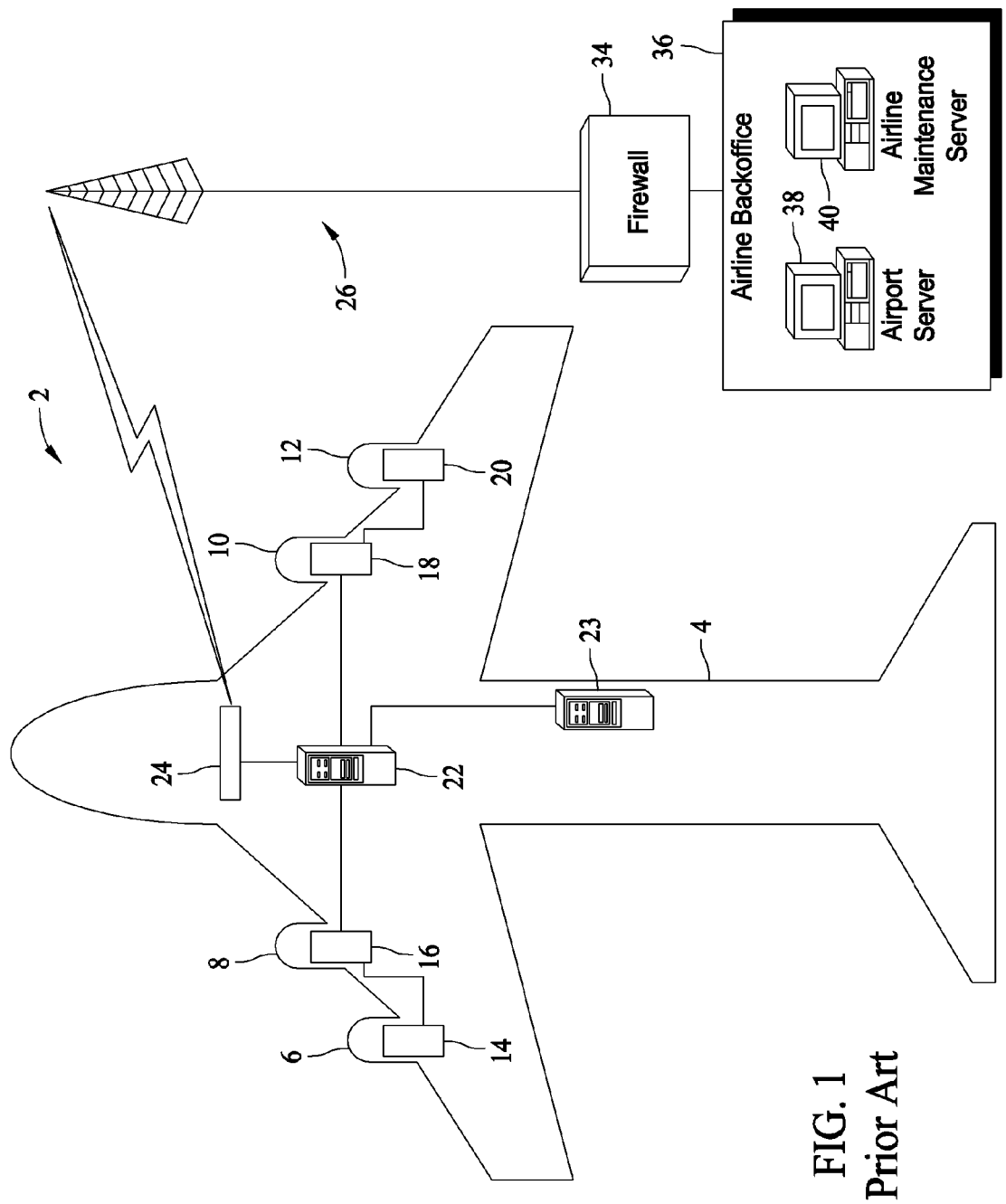
FIG. 1 is a schematic illustration of an airplane and a ground system, the airplane including a common server and a single wireless communication unit.

FIG. 1 is a schematic illustration of a known communication system 2 currently used for AGSC. System 2 includes an airplane 4 including four engines 6, 8, 10, and 12. Each engine includes an electronic digital controller monitor (EDCM) 14, 16, 18, and 20. EDCMs 14, 16, 18, and 20 monitor the operation of engines 6, 8, 10, and 12, respectively. EDCMs 14, 16, 18, and 20 may monitor such aspects of operation as temperatures at various locations, vibration, and fuel usage. System 2 also includes a central network file server 22, in communication with EDCMs 14, 16, 18, and 20, which may serve as a storage device for the data collected by EDCMs 14, 16, 18, and 20. Server 22 may also store data collected by other monitors, or data input by crewmembers of airplane 4. In one example embodiment, server 22 also stores in-flight entertainment data, such as movies and music. In another example embodiment, system 2 includes an in-flight entertainment server 23, positioned separately from and connected to server 22, which may store entertainment offerings. Central network file server 22 and entertainment server 23 are in communication with a transmitter/receiver 24. Transmitter/receiver 24 may be a VHF radio transmitter/receiver or a Terminal Wireless LAN Unit (TWLU) that transmits data from central server 22 to a ground system 26. Because current AGSC utilizes VHF frequencies or a single TWLU, current AGSC is limited as to the amount of data that can be transferred in an amount of time acceptable to a user. The amount of time acceptable for a user to wait for a data transfer varies.

Time limitations can arise for multiple reasons, including, but not limited to, airport schedules and business constraints.

As stated above, wireless communication systems between an aircraft and a ground system are known. With at least some of such systems, data is constantly collected from monitors such as EDCMs. As the data is collected, it may be stored in a local memory or transferred and stored on central server 22. When an aircraft arrives on the ground, data is downloaded from central server 22 to ground system 26 utilizing VHF radio transmission or a single TWLU 24. Data may also be uploaded to central server 22 and entertainment server 23 from ground system 26 as well.

Communication utilizing TWLU 24 is an example of a client-server network architecture. A client may be a computer, processor, or device that is configured to connect with a server or a network. In this embodiment, the client is TWLU 24 and the server is ground system 26. Central server 22 instructs TWLU 24 to send a request to ground system 26 to initiate communication. In order for TWLU 24 to communicate with ground system 26, TWLU 24 and ground system 26 may utilize a variety of wireless standards, also referred to as protocols. Currently, TWLU 24 may utilize protocols including, but not limited to, IEEE 802.11, IEEE 802.11b, IEEE 802.11g, IEEE 802.16, IEEE 802.11a, IEEE 802.11n, CDMA, TDMA, 3G, and 4G. Each protocol has a maximum data rate, which in this situation, is the amount of data capable of being transferred between airplane 4 and ground system 26 in a prescribed period of time. For example, IEEE 802.11b is capable of data rates of 11 megabits per second (Mbits/s), while IEEE 802.11g is capable of data rates of 54 Mbits/s. Since current AGSC systems include a single client and a single access point, the maximum data rate of the AGSC system is limited to the maximum data rate of the protocol utilized.

As airplanes have gone from analog systems to fully digital systems, a greater number of systems are monitored, and a greater amount of data is collected regarding the operation of the airplane. For example, as described above, EDCMs collect data related to engine operating characteristics such as compression, temperature, and vibration. Other monitoring systems not only collect operational data of the airplane itself, such as monitoring the engines and fuel usage, but also systems monitoring airline operations such as baggage information, passenger information/preferences, and catering information. Another large source of data transferred from ground system 26 to central server 22 and entertainment server 23 relates to the entertainment of airplane passengers. For example, it is desirable to update movies and music that may be made available to the passengers. Known AGSC systems do not provide a high enough data rate to transfer the amount of data desired within a time period acceptable to a user. Some known airplanes monitor up to 6,000 areas of operation, but record less than 10% of those areas for future transfer to ground system 26 because of the data transfer restrictions. An AGSC system that allows for greater bandwidth and transfer speeds would be beneficial to airplane operation. One way to increase transfer speeds while utilizing standard transfer protocols would be to utilize multiple clients and multiple access points.

Figure 2:
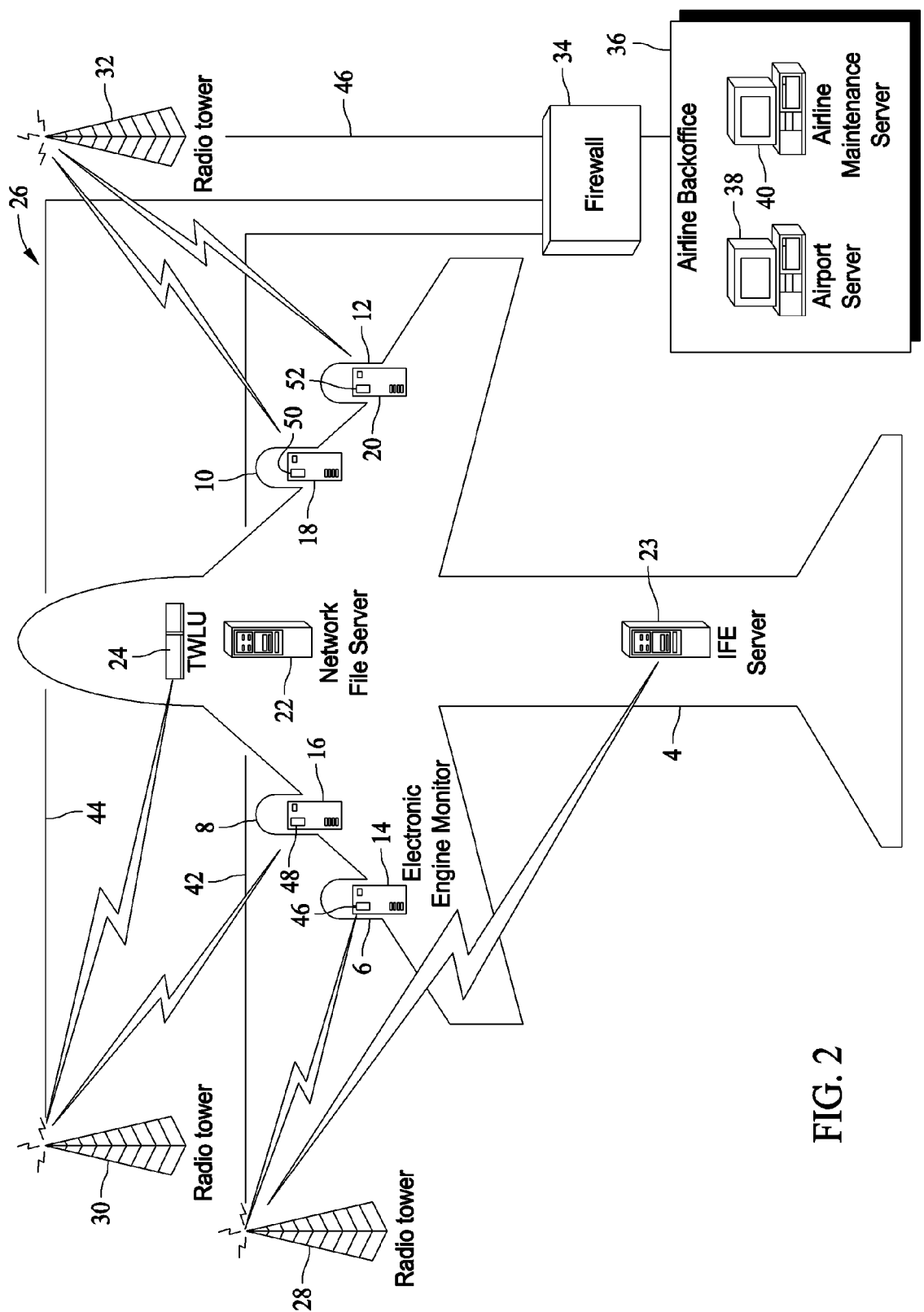
FIG. 2 is a schematic illustration of an airplane with multiple clients communicating, via a wireless local area network (WLAN), with a ground system.

FIG. 2 is a schematic illustration of an airplane with multiple clients communicating, via a wireless local area network, with a ground system. In one specific example, airplane 4 includes four EDCMs 14, 16, 18, and 20, which correspond to engines 6, 8, 10, and 12. Airplane 4 also includes central server 22, entertainment server 23, and TWLU 24. Ground system 26 includes, in this example embodiment, three access points 28, 30, and 32, which may be connected to a ground system firewall 34 and a ground system office 36. Within ground system office 36 is a ground system server 38 and a maintenance server 40. Ground system firewall 34 is located between access points 28, 30, and 32 and ground system office 36, and is an example of a security measure that may be utilized to prevent unwanted, and potentially destructive, data from being transferred from ground system office 36 to airplane 4 or from airplane 4 to ground system office 36. In this embodiment, wires 42, 44, and 46 place access points 28, 30, and 32, respectively, in communication with firewall 34, and ultimately, if the security requirements are met at firewall 34, with ground system office 36.

As stated above, airplane 4 of FIG. 2 includes four EDCMs 14, 16, 18, and 20. Each of EDCM 14, 16, 18, and 20 is individually collecting data related to the operation of a respective engine and digitizing the data, for example, in a TCP/IP format. EDCMs 14, 16, 18, and 20 each is communicatively coupled to a client 46, 48, 50, and 52 that is configured to connect with an access point of ground system 26. Once one of clients 46, 48, 50, and 52 is in communication with one of access points 28, 30, and 32, data is transferred between the EDCM and the access point. Multiple clients 46, 48, 50, and 52 in communication with multiple access points 28, 30, and 32, provide parallel lines of communication between airplane 4 and ground system 26. This configuration of multiple clients in communication with one or more access points facilitates providing quicker data transfer between a vehicle and a ground system than an AGSC system that includes a single connection between a vehicle and a ground system.

Various airports provide various data transfer capabilities. In an exemplary embodiment, ground system 26 includes four access points available to connect with four clients. In this embodiment, each access point may communicate with a single client. However, access points utilizing IEEE protocols generally are able to communicate with more than one client. FIG. 2 illustrates an embodiment of the current invention where ground system 26 includes three access points 28, 30, and 32. In this embodiment, client 46 and entertainment server 23 connect with access point 28, client 48 connects with access point 30, and both clients 50 and 52 connect with access point 32. Assembling a ground system with multiple access points has become more feasible because of a reduction in the cost of commercially available access points. However, in yet another embodiment, clients 46, 48, 50, and 52 connect with a single access point. In this embodiment, clients 46, 48, 50, and 52 transmit in parallel utilizing multiple channels of the single access point. The embodiments including a lesser number of access points than clients may not transfer data as quickly as an embodiment including an equal number of access points and clients, however, each of these embodiments is believed to provide quicker overall transfer times than the single TWLU 24 system of FIG. 1.

Figure 3:
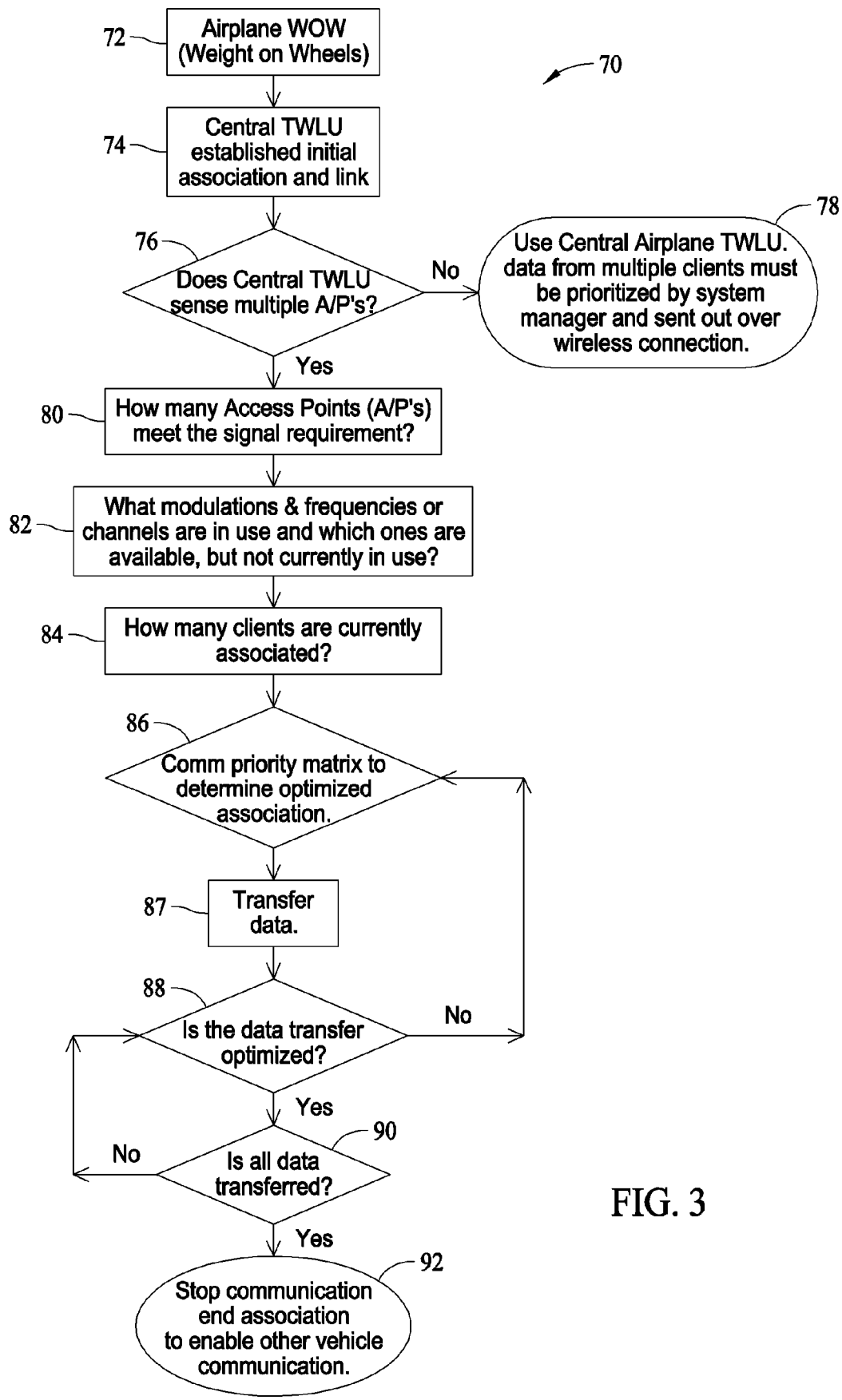
FIG. 3 is a flow chart illustrating steps associated with communication between onboard clients and a ground system.

FIG. 3 is a flow chart illustrating the steps associated with one embodiment of AGSC. An AGSC system 70, for example the AGSC system of FIG. 2, is initiated when airplane 4 has WOW 72 or a vehicle is within a range of the ground system. A vehicle is within the range of the ground system when a system manager senses an access point. A central TWLU client establishes an initial association and link 74 with the ground system. Establishing an initial association and link 74 includes searching for all detectable access points 76. If the central TWLU does not detect multiple access points, the data is transferred between the central TWLU and the single sensed access point 78. In one example, transferring data between the central TWLU and the single sensed access point 78 includes configuring the system manager to prioritize the data from the multiple clients, transmitting data of higher importance before transferring data of lower importance. In another example, if the central TWLU does not detect multiple access points, the system manager instructs multiple clients to connect with the single sensed access point. In an exemplary embodiment, the system manager is made up of a processor. In another embodiment, the system manager is a software program loaded onto, and executed by central server 22. In another embodiment, the system manager is a software program loaded onto, and executed by, ground system 26 to manage communication between the clients and the access points either instead of the client-side system manager, or along with the client-side system manager. In yet another embodiment, the system manager is a user who inputs priority rankings into central server 22 or a server included in the ground system.

However, if the central TWLU locates more than one access point, the system manager counts the number of access points that meet the established signal requirements 80. The established signal requirements can include, for example, access point signals within a designated range and having a suitable signal quality. The signal requirements are variable, and may be manually or automatically adjusted to support overall system performance. The system manager is configured to analyze the functionality of each access point, for example, which modulations, frequencies, or channels of the access point are available, and of the available modulations, frequencies, or channels of the access point, which are in use 82. The system manager also monitors how many clients are currently on the vehicle and configured to transmit data to the ground system or receive data from the ground system 84. The system manager creates a communication priority matrix to determine the optimized association between the number of clients and the number of available access points that are not in use 86. Data is transferred 87 between the clients and the ground system according to the communication priority matrix. The system manager monitors the data transfers to insure they are optimized 88, and, if necessary, repeats the analysis required to create the communication priority matrix 86. The rate at which the system manager monitors for optimization and modifies the communication priority matrix is variable and may be adjusted from a preset rate by a user. The overall data transfer is optimized when the communication priority matrix meets preset criteria defining an optimized data transfer.

The system manager monitors the data transfer until all data has been transferred to the ground system 90. If all of the data has not been transferred, the system manager continues to monitor the transfer 90 and the optimization of the data transfer 88. If all data has been transferred, communication between the clients and the access points is discontinued, and the associations of the clients and the access points are ended 92. In an exemplary embodiment, the system manager ends the association between the clients and the access points at the completion of all of the data transfers. In another embodiment, the system manager ends the association between each client and the corresponding access point at the completion of that specific data transfer. In other words, the multiple associations between clients and access points can all be disconnected simultaneously upon the completion of the last complete data transfer, or the multiple associations between clients and access points can each end upon the completion of each separate data transfer. Ending the association between clients and access points upon the completion of the data transfer allows another user to associate with, and connect to, the access point.

As stated above, multiple clients transferring data to multiple access points in parallel reduces the amount of time required to transfer data between a vehicle and a ground system. Furthermore, creating a communication priority matrix to determine the optimized association between clients and access points 86 based on the number of available access points 76, a detected signal strength 80, and how many clients are associated with each access point 84, also reduces data transfer times.

The term "user", as used herein, includes a human operator, as well as systems and applications. Therefore, the term user is not limited to being a human, and in many instances references a system or application that includes software operating on a processor.

Also, as used herein, the term "processor" refers to a digital processor, an analog processor, as well as any analog and digital circuit as well as software, including combinations thereof, capable of performing the described functions. For example, the processor could be a microprocessor, a computer, an analog circuit, a combination analog and digital circuit, a server (e.g., an e-mail server, a general purpose server), an integrated circuit, software, and any combination of the foregoing. Also, the described processing need not be performed by a single processor, but could be performed across more than one processor.

While the invention has been described in terms of various specific embodiments, those skilled in the art will recognize that the invention can be practiced with modification within the spirit and scope of the claims.

What is claimed is:

1. A method of communicating data between a vehicle and a ground system, the ground system comprising a plurality of access points, said method comprising:
    initiating connections between a plurality of clients on a vehicle and at least two of the plurality of access points, wherein each client of the plurality of clients is configured to connect directly with an access point;
    communicating, in parallel, data between the plurality of clients and the ground system via the at least two access points, wherein each client is in communication with a separate access point to facilitate providing faster data transfer between the vehicle and the ground system;
    optimizing communications between the plurality of clients and the plurality of access points via a communication priority matrix created based at least in part on the number of clients and the number of available access points; and
    ending communication between the plurality of clients and the at least two access points, and any association between the plurality of clients and the at least two access points, upon completion of a data communication.

2. A method in accordance with claim 1 wherein initiating connections between a plurality of clients and the at least two access points comprises configuring the plurality of clients to search for and connect with the at least two access points via a wireless network.

3. A method in accordance with claim 1 that further comprises providing the plurality of clients with data collected from a plurality of monitors onboard the vehicle.

4. A method in accordance with claim 1 wherein communicating, in parallel, data between the plurality of clients and the ground system via the at least two access points further comprises configuring each access point to provide parallel communications for a plurality of the clients.

5. A method in accordance with claim 1 wherein the communication priority matrix is created based on
    a signal strength of each available access point.

6. A system for communicating data from a vehicle to a ground system, the ground system comprising a plurality of access points, said communicating system comprising a plurality of clients onboard the vehicle, each said client configured to communicate, in parallel with said other clients, with said ground system via the plurality of access points, wherein each said client is configured to connect directly with an access point and all of the data from each said client is communicated via only the access point with which the client is connected to facilitate faster data transfer between the vehicle and the ground system, said system further configured to end communications and associations between said clients and said access points upon completion of a data communication, said system further comprising a system manager configured to optimize communications between the plurality of clients and the plurality of access points via a communication priority matrix created based at least in part on the number of clients and the number of available access points.

7. A system in accordance with claim 6 wherein at least one of said clients is coupled to an engine monitor for transmitting data collected by the engine monitor to said ground system.

8. A system in accordance with claim 6 wherein at least one of said plurality of clients is coupled to an in-flight entertainment system for transmitting content updates from said ground system.

9. A system in accordance with claim 6 wherein at least one of said plurality of clients is coupled to an airplane avionics system for transmitting data collected by an Airplane Health Management system.

10. A system in accordance with claim 6 wherein each of said plurality of clients is configured to communicate with the plurality of access points via a wireless network.

11. A system in accordance with claim 10 wherein said wireless network comprises a terminal wireless LAN.

12. A system in accordance with claim 6 wherein said ground system comprises at least one of a ground system server and a maintenance server.

13. A system in accordance with claim 6 wherein said system manager is configured to monitor a detected signal strength from each of said access points.

14. A system in accordance with claim 6 wherein at least one of said plurality of clients onboard the vehicle is coupled to said system manager, and wherein said system manager is programmed to determine when the vehicle is within a predetermined range of a ground system.

15. A system in accordance with claim 6 wherein said system manager is further configured to:
  determine whether an access point signal strength is sufficient for communication; and
  determine which channels of said ground system access points are available for use.

16. A system in accordance with claim 6 wherein said system manager is further configured to utilize the communication priority matrix to assign a communication channel to each said respective client for use in communicating with said ground system.

17. A system in accordance with claim 6 wherein the vehicle includes a plurality of engines, a respective engine monitor coupled to each respective engine, and a separate one of said clients coupled to a respective one of said engine monitors.

18. A system in accordance with claim 6 wherein each of the access points is operable to communicate, in parallel, with a plurality of the clients.

19. A method in accordance with claim 1, wherein the vehicle is an airplane, the method further comprising performing said initiating connections based on determining that the airplane is on the ground.

* * * * *